Aug. 18, 1942.　　L. BERNER ET AL　　2,293,636
SCRAPER
Filed Sept. 11, 1939　　5 Sheets-Sheet 3

LEO BERNER &
CLAUDE B. OGLE,
INVENTORS;
BY
ATTORNEY.

Aug. 18, 1942. L. BERNER ET AL 2,293,636
SCRAPER
Filed Sept. 11, 1939 5 Sheets-Sheet 4
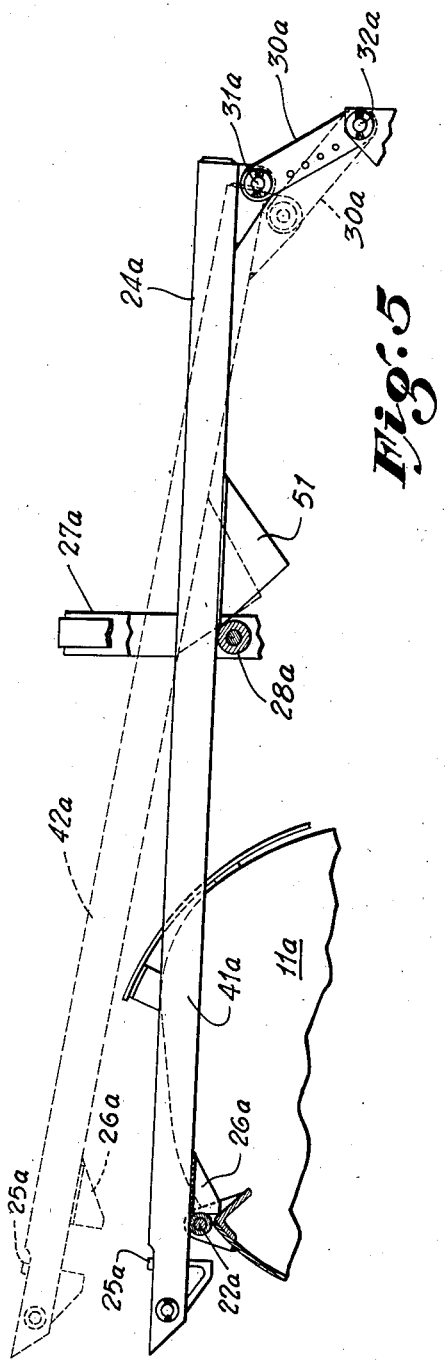
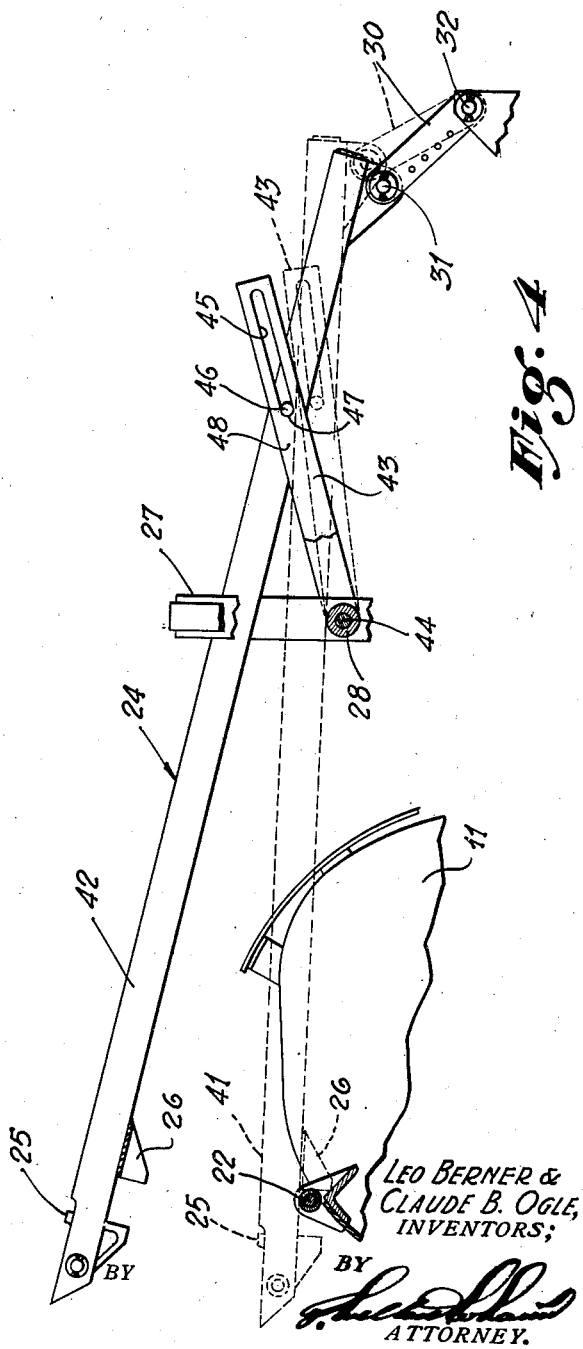
Leo Berner &
Claude B. Ogle,
INVENTORS;
BY
ATTORNEY.

Patented Aug. 18, 1942

2,293,636

UNITED STATES PATENT OFFICE 2,293,636

SCRAPER

Leo Berner, Huntington Park, and Claude B. Ogle, Los Angeles, Calif., assignors to Atlas Scraper and Engineering Co., Bell, Calif., a corporation of California Application September 11, 1939, Serial No. 294,246

14 Claims. (Cl. 37—129)

Our invention relates to rotary scrapers, such as are used for digging, carrying, levelling, and dumping earth.

It is the principal object of our invention to provide a rotary scraper in which the positions of the bowl and releasing of the bowl into dumping position are controlled wholly through the medium of a longitudinal latch bar which may be operated by the operator of the tractor pulling the scraper by the use of a single operating lever.

The advantage of such a construction as this is well appreciated when it is known that the rotary scraper is usually drawn by a tractor and the operator operates the tractor and also the scraper. In common types of rotary scrapers a plurality of controls is required to move the bowl into various positions and to dump the bowl. When working under difficult conditions this places considerable burden on the operator, since his time may be fully occupied in operating the tractor. The ability to operate the scraper through a single operating lever or means is an advance of real merit over the art.

It is a further object of our invention to provide a rotary scraper in which the latch bar or latch means is raised from engagement with a stop on the scraper bowl in order to permit the bowl to rotate and in which there is a means which automatically disengages the latch means from the stop on the bowl upon a predetermined movement of the latch means.

It is another object of our invention to provide a rotary scraper having a longitudinally movable latch bar which engages one or more stops on the bowl and in which the latch bar upon reaching a predetermined longitudinal position is quickly moved to disengage or release the stop and to completely clear the bowl and all parts thereof as the bowl rotates as a consequence of the disengagement of the latch bar from the stop.

Another object of our invention is to provide a combination as set forth in the preceding paragraph in which the releasing of the latch bar from the stop is accomplished by a rapid raising of the latch bar, which rapid raising of the latch bar is caused by means cooperating between the latch bar and the draft frame.

When the bowl of a rotary scraper is moved from digging into carrying position a quantity of dirt which has been piled up ahead of the blade falls to the ground and is lost as a part of the load. It is an object of our invention to provide a rotary scraper having an apron which is automatically moved into a raised position when the bowl is in digging position and into a lowered position when the bowl is in carrying position. This apron catches the dirt in front of the blade and retains it in the forward part of the bowl, thus enabling the scraper to carry a larger load.

It is another object of our invention to provide a scraper having an apron, as pointed out in the preceding paragraph, in which the apron is operatively connected with the latch means and operates in conjunction therewith so that a movement of the latch means results in a movement of the apron between raised and lowered positions.

Other objects and advantages of our invention will be brought out during the course of the following detailed description of three forms in which we have illustrated our invention in the accompanying drawings. It should be understood that our invention is not limited to the details of construction shown and described herein but may be embodied in other structures without departing from the spirit and scope of the invention. We therefore wish our invention to be broadly construed in accordance with the preceding statement of invention and appended claims.

Referring to the drawings in detail:

Fig. 4 is a fragmentary longitudinal sectional view illustrating the latch bar in released position.

Fig. 5 is a fragmentary longitudinal view illustrating an alternative means for moving the latch bar into a released position, this means including a cam mounted on the latch bar.

Figure 1:
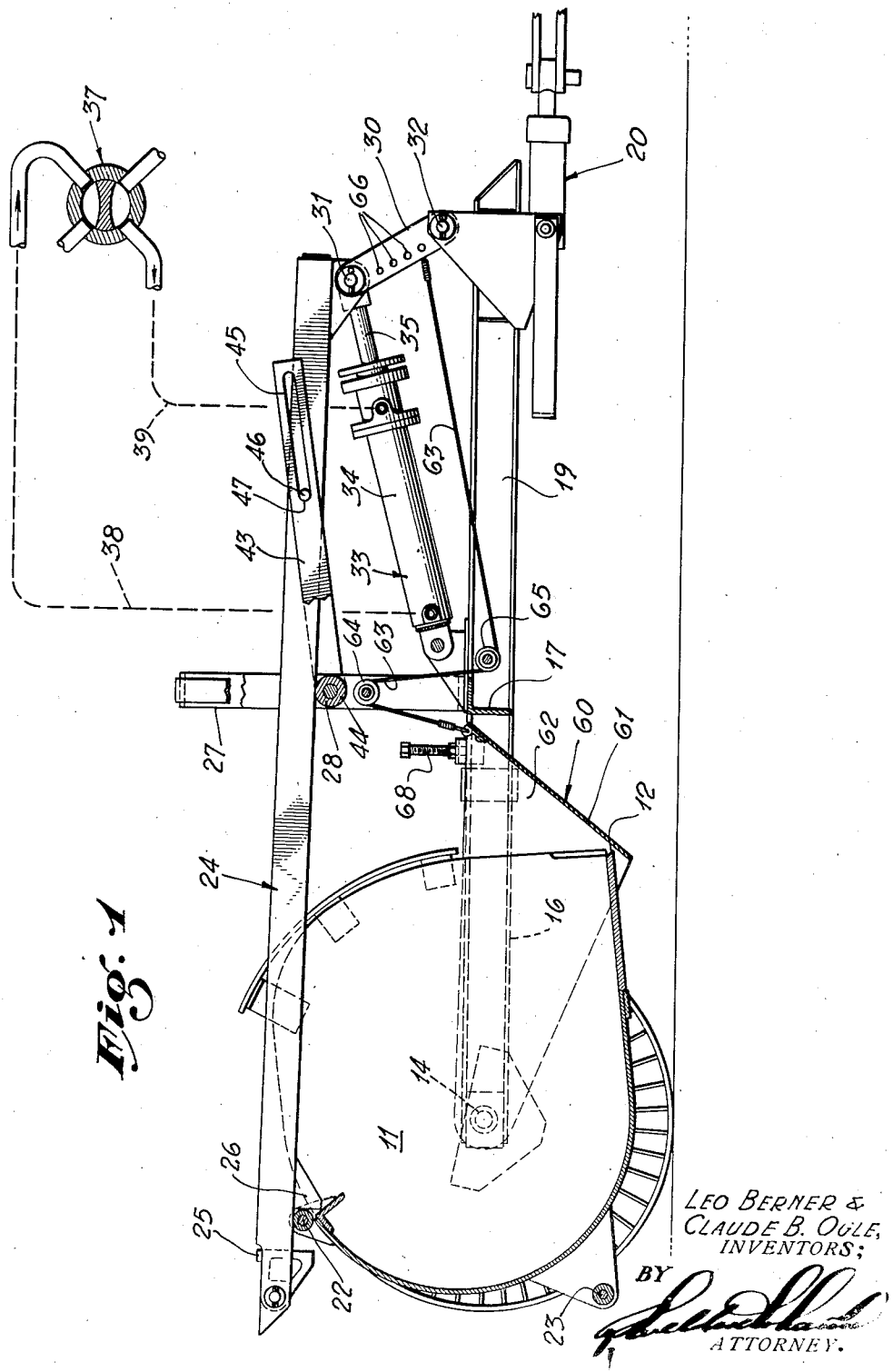
Fig. 1 is a longitudinal sectional view of one form of our invention, the bowl being in carrying position, and this view being taken along the line 1—1 of Fig. 2.

Referring to Figs. 1 to 4 inclusive, we will describe the first form of our invention. The numeral 11 represents a bowl having a cutting edge 12 and having outwardly extending trunnions 14 upon which wheels 15 are rotatable. For moving the bowl 11 there is a draft frame having side bars 16, in the rearward ends of which the trunnions 14 are journaled, these side bars 16 extending on each side of the bowl. Connected to the forward end of the side bars 16 is a cross-bar 17 and diagonal bars 18 which are in turn connected to a central forwardly extending bar or tongue 19, to the forward end of which a draft connection 20 is secured whereby the scraper may be moved either forwardly or rearwardly.

The bowl 11 is provided with one or more stops 22 and 23 which are engageable by a latch means whereby the bowl may be retained in digging, carrying, or spreading positions.

The latch means of our invention includes a longitudinal latch bar 24 which extends from the forward part of the draft frame rearwardly over the bowl 11 and has a pivoted back-up plate 25 and engager 26 connected thereto in accordance with standard practice. The latch bar 24 extends through a central post 27 which is secured to the draft frame, and which includes a roller support 28 on which the latch bar may rest. The forward end of the latch bar is connected by means of a latch bar link 30, which forms a part of the latch means, to the forward part of the draft frame. This link 30 is pivoted at 31 to the latch bar and at 32 to the draft frame. This link 30 acts as a means for guiding and supporting the forward end of the latch bar 24.

For the purpose of longitudinally moving the latch bar between its various longitudinal positions, we provide an operating means which includes a hydraulic ram arrangement 33 having a cylinder 34 in which a piston is operable, this piston being connected to a forwardly extending piston rod 35 which is in turn connected to the forward part of the latch bar 24, preferably between the two parts which form the link 30 and preferably on the shaft which constitutes the pivot 31. The ram 33 is operated by fluid which may be introduced into or withdrawn from either end of the cylinder 34 through the operation of a four-way valve 37 which is connected to opposite ends of the cylinder 34 through conduits 38 and 39 diagrammatically illustrated in Fig. 1. By operating the four-way valve the piston rod 35 is moved forwardly or pulled rearwardly, thus moving the latch bar between its various positions, as will be described.

This hydraulic means of operating the latch bar constitutes but one of a plurality of means which may be employed. For example, we may employ a direct drive connection to the tractor or we may employ a cable and spring means or any other means known in the art whereby the latch bar 24 may be moved longitudinally.

When the latch bar is in the position shown in Fig. 1 and the engager 26 in engagement with the stop 22, the bowl is retained in a carrying position. By operating the ram 33 to move the latch bar 24 forwardly into the position shown in Fig. 3, the bowl is allowed to rotate into digging position. At this time the blade 12 is below the surface of the ground, and upon pulling the scraper in a forward direction earth will be gathered in the bowl 11. After the bowl has been filled with earth the latch bar is returned to the position shown in Fig. 1 and the earth carried to the place where it is to be dumped.

In order to dump the load of earth it is necessary to move the latch bar from the position which it occupies, as shown in Fig. 1 and as shown by dotted lines 41 in Fig. 4, into a position illustrated by full lines in Fig. 4, and which position is referred to as a raised or released position 42.

Figure 2:
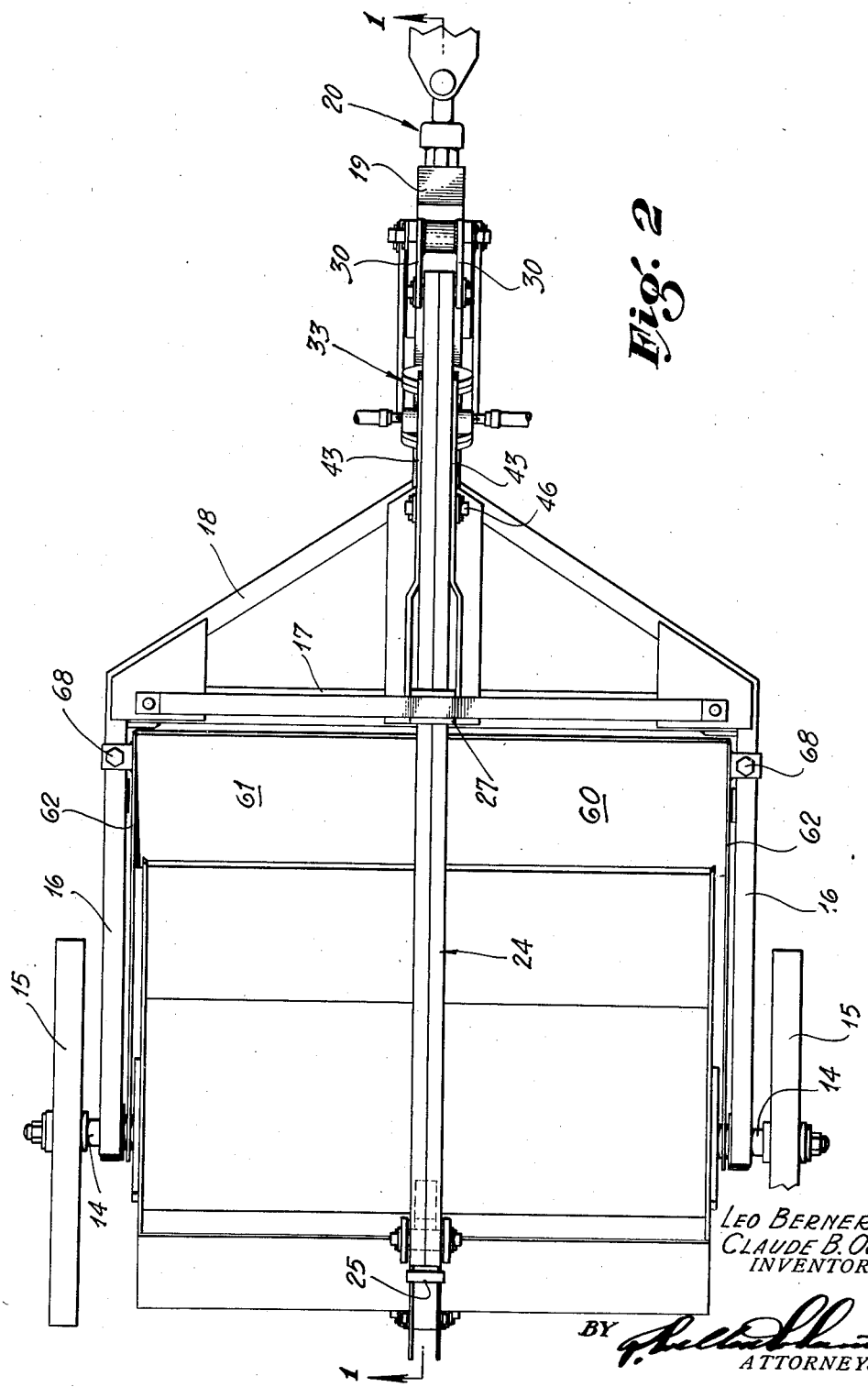
Fig. 2 is a plan view of Fig. 1.

In this form of our invention we provide a release means or disengaging means in the form of a lever or link 43 which is pivotally connected at 44 to the draft frame. For the purpose of this description it is understood that various parts connected to the draft frame structure may be considered as a part of the draft frame. The link 43 may include one or a pair of bars 43 arranged as shown in Fig. 2. These bars 43 have longitudinal slots 45 at their forward ends, through which slots engagement pins 46 extend, these engagement pins 46 being secured to and extending outwardly from the opposite sides of the latch bar 24. When the latch bar is moved from the position shown in Fig. 1 into the position shown in Fig. 3 the pins 46 move forwardly in the slots 45, and therefore the latch bar is free to move, being supported at its forward end by the link 30 and at its central part by the roller support 28. When the latch bar is moved rearwardly from the position shown in Fig. 1 the pins 46 come into engagement with end walls or engagement walls 47 which constitute the rearward ends of the slots 45 which prevent the latch bar from moving rearwardly on the roller support 28 and cause a lifting thereof from the position shown by dotted lines in Fig. 4 into the position shown by full lines in Fig. 4. When this occurs the raising link or lever 43 moves from the dotted line position of Fig. 4 into the full line position 48 of Fig. 4. At the time the pins engage the walls 47 the latch bar 24 is supported at two points, at the pivot 31 and at the end walls 47. As the latch bar moves rearwardly the point of support at the walls 47 is swung upwardly while the point of support at the pivot 31 is swung downwardly. This produces a rapid rotating of the latch bar in a clockwise direction, and, with but very small longitudinal movement, raises the rear end of the latch bar 24 a relatively large amount. When the latch bar is in raised position it will be seen that it entirely clears the bowl 11 and all parts which rotate therewith.

When in this position the bowl, of course, is free to rotate and to dump its load. By a very slight forward movement of the latch bar it is again returned to a position wherein one of the stops 22 or 23 may be engaged.

It will be seen that the releasing of the latch bar is automatically accomplished in consequence of the operation of the latch bar itself, and it will be seen that this raising is accomplished merely by moving the latch bar rearwardly, and that this rearward movement is produced through the four-way control valve 37. It will therefore be seen that the scraper bowl can be retained in any of its positions, moved between any of its various positions, or fully released by the operation of a single operating lever.

In Fig. 5 we show an alternative form of our invention and in this figure corresponding parts will have the same numerals as in Figs. 1 to 4 inclusive except that the suffix $a$ will be added. In this form of our invention in place of the raising link or lever 43 and pins 46 we provide a cam 51 which is secured to the latch bar 24$a$. When the latch bar is moved forwardly from the position shown by full lines in Fig. 5 the latch bar is supported on the pivot 31$a$ and roller 28$a$. When the latch bar 24$a$ is moved rearwardly the cam 51 engages the roller 28$a$ and raises the latch bar 24a from full line position in Fig. 5 into dotted line position 42a. It will therefore be seen that in this form of our invention cam means is provided which automatically operates as a result of rearward movement of the latch bar to rapidly raise the latch bar into released position.

Figure 6:
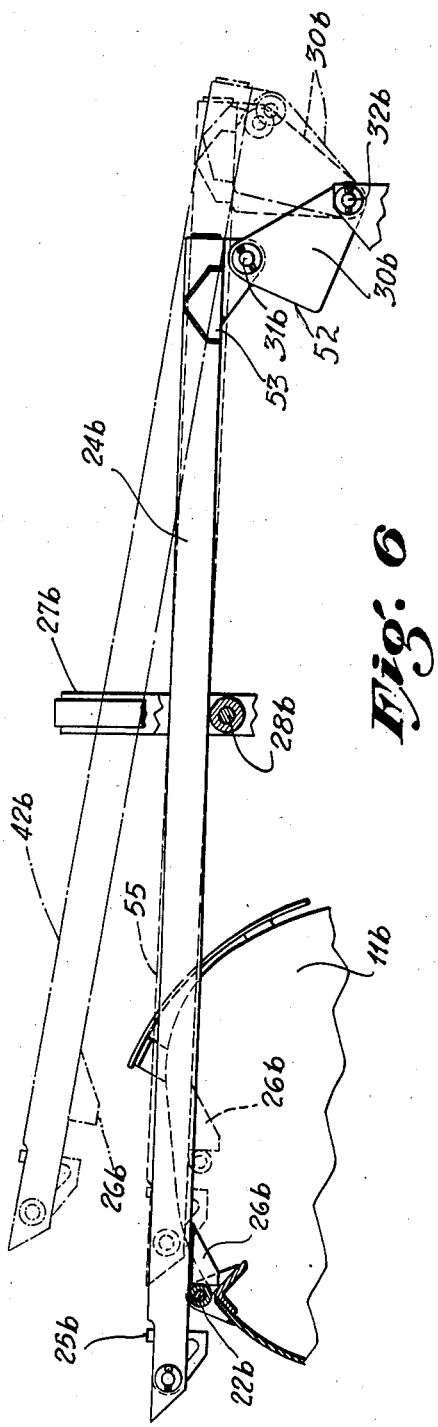
Fig. 6 is a fragmentary view showing a third form of our invention for moving the latch bar into a released position, this form of our invention including a cam mounted on a latch bar link connected between the latch bar and the draft frame.

In the form of our invention shown in Fig. 6 corresponding parts will have the same numerals as in the form of our invention shown in Figs. 1 to 4 except that the suffix b will be added. In this form of our invention the latch bar link 30b is provided with cam formations 52 and the forward end of the latch bar 24b is provided with a suitable engagement wall 53. In this form of our invention the latch bar may be moved forwardly into a dotted line position 55, at which time the bowl 11b is in digging position. To release the bowl the latch bar 24b is moved forwardly, and when this occurs the cam 52 engages the engagement wall 53 and thus locks the link 30b and the latch bar 24b together so that the latch bar 24b then rotates with the link 30b and is thus rapidly raised into a released position indicated by broken lines 42b.

Figure 3:
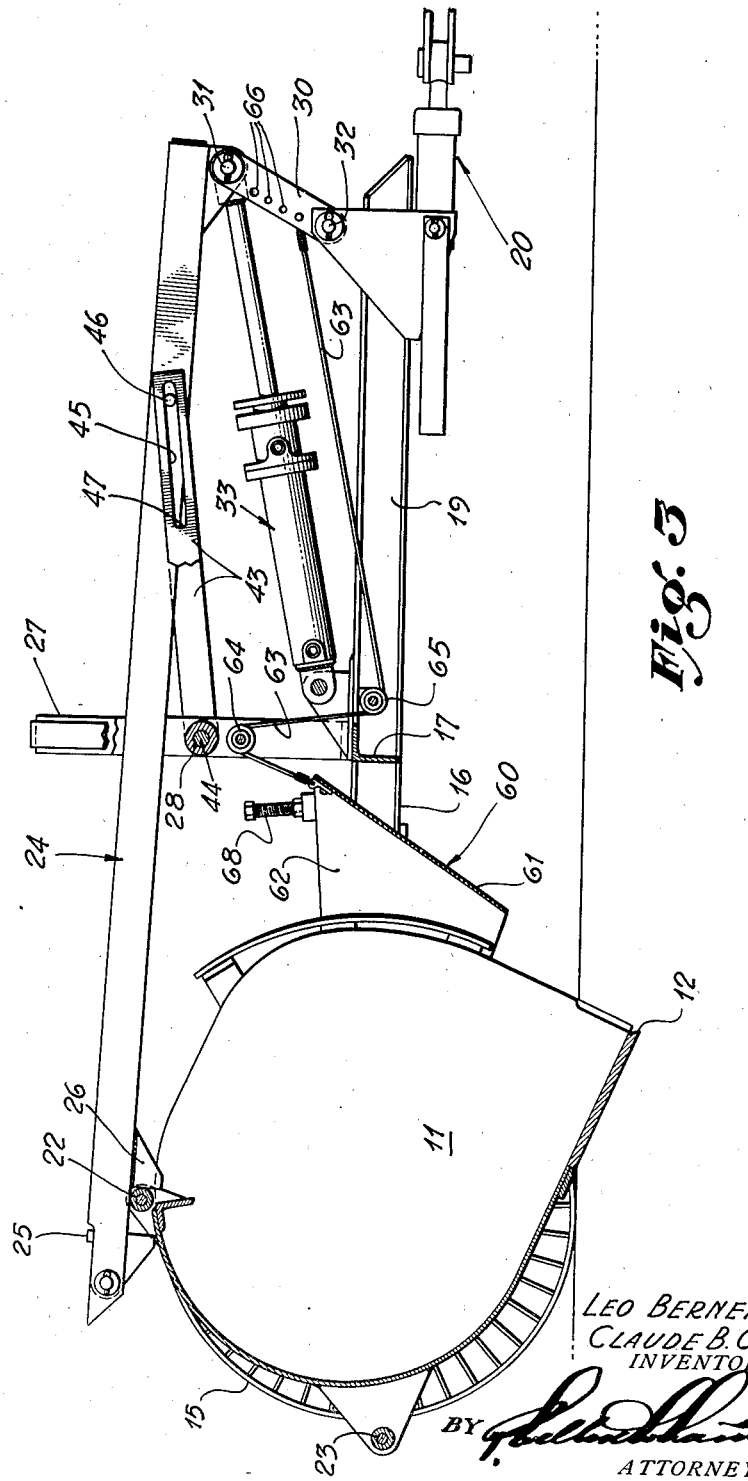
Fig. 3 is a view similar to Fig. 1 but showing the bowl in digging position.

Adapted to cooperate with the different elements disclosed and described in the three forms of our invention we provided a unique apron arrangement which is shown only in Figs. 1 to 4 inclusive. This apron arrangement includes an apron 60 having a forward wall 61 and side walls 62 which are journaled on the trunnions 14. For the purpose of determining the lowered position or carrying position of the apron 60 we provide a height adjustment screw 69, as illustrated. For the purpose of raising the apron from lowered position or carrying position, as shown in Fig. 1, into a raised position, as shown in Fig. 3, we provide an apron operating means in the form of a flexible member or cable 63 which extends over rollers 64 and 65 secured to the draft frame and to the latch bar lever or link 30. There is a plurality of connecting openings 66 in the link 30 so that different amounts of movement may be had. By this arrangement the apron 60 will be in a lowered position whenever the bowl is in carrying position, as shown in Fig. 1, and when the bowl is moved into digging position the apron will automatically move into a raised position, as shown in Fig. 3. When the load of earth has been gathered and the bowl returned to carrying position the apron will lower and will cooperate with the bowl in carrying the load of earth therein.

It is believed that from the foregoing description those in the art will readily understand the invention and the manner in which its principle may be embodied in various structures. As stated heretofore, we believe our invention to be susceptible of embodiment in other forms, and we therefore wish our invention to be construed in accordance with the spirit and scope of the statement of invention and appended claims.

We claim as our invention:

1. In a scraper of the class described, the combination of: a bowl; a draft frame whereby said bowl may be moved along the ground; a stop on said bowl; a latch bar supported by said draft frame for longitudinal and vertical movement and engageable with said stop; means for longitudinally moving said latch bar; and means automatically operating in consequence of the movement of said latch bar into a predetermined longitudinal position to rapidly raise said latch bar from engagement with said stop.

2. In a scraper of the class described, the combination of: a bowl; a draft frame whereby said bowl may be moved along the ground; a stop on said bowl; a latch bar movably supported by said draft frame and engageable with said stop; means for longitudinally moving said latch bar; and cam means cooperating between said draft frame and said latch bar and adapted to be brought into operation in consequence of said latch bar reaching a predetermined longitudinal position, said last named means being operable to remove said latch bar from engagement with said stop.

3. In a scraper of the class described, the combination of: a bowl; a draft frame whereby said bowl may be moved along the ground; a stop on said bowl; a latch bar movably supported by said draft frame and engageable with said stop; means for longitudinally moving said latch bar; and means brought into operation in consequence of said latch bar moving into an extreme forward position, said last named means being operable to remove said latch bar from engagement with said stop.

4. In a scraper of the class described, the combination of: a bowl; a draft frame whereby said bowl may be moved along the ground; a stop on said bowl; a latch bar supported by said draft frame for longitudinal and vertical movement and engageable with said stop; means for longitudinally moving said latch bar; and means for rapidly raising said latch bar from engagement with said stop upon said latch bar reaching a predetermined longitudinal position, said last named means including a cam on said latch bar which engages a cooperating part on said draft frame.

5. In a scraper of the class described, the combination of: a bowl; a draft frame whereby said bowl may be moved along the ground; a stop on said bowl; a latch bar supported by said draft frame for longitudinal and vertical movement and engageable with said stop; means for longitudinally moving said latch bar; and means for rapidly raising said latch bar from engagement with said stop upon said latch bar reaching a predetermined longitudinal position, said last named means including a link connected between said latch bar and said draft frame and coengageable walls which are brought into coengagement when said latch bar reaches said predetermined position.

6. In a scraper of the class described, the combination of: a bowl; a draft frame whereby said bowl may be moved along the ground; a stop on said bowl; a latch bar supported by said draft frame for longitudinal and vertical movement and engageable with said stop; means for longitudinally moving said latch bar; and means for rapidly raising said latch bar from engagement with said stop upon said latch bar reaching a predetermined longitudinal position, said last named means including a link pivoted to said latch bar and said draft frame and coengageable walls which are brought into coengagement when said latch bar reaches said predetermined position.

7. In a scraper of the class described, the combination of: a bowl; a draft frame whereby said bowl may be moved along the ground; a stop on said bowl; a latch bar supported by said draft frame for longitudinal and vertical movement and engageable with said stop; means for longitudinally moving said latch bar forwardly and rearwardly through a plurality of positions of adjustment; and means for rapidly raising said latch bar from engagement with said stop upon said latch bar reaching a predetermined longitudinal position, said last named means including a link pivoted to said latch bar and to said draft frame and having an engagement wall adapted to engage a wall on said latch bar when said latch bar reaches said predetermined position.

8. In a scraper of the class described, the combination of: a bowl; a draft frame whereby said bowl may be moved along the ground; a stop on said bowl; a latch bar supported by said draft frame for longitudinal and vertical movement and engageable with said stop; means for longitudinally moving said latch bar; and means for rapidly raising said latch bar from engagement with said stop upon said latch bar reaching a predetermined longitudinal position, said last named means including a link pivoted to said draft frame and having a slot therein, and a pin on said latch bar engageable with the end wall of said slot when said latch bar reaches said predetermined position.

9. In a scraper of the class described, the combination of: a bowl movable between digging, carrying, and dumping positions; a draft frame whereby said bowl may be moved along the ground; stop means on said bowl; latch means movably supported on said draft frame having a latch bar engageable with said stop; means for longitudinally moving said latch bar for moving said bowl between digging and carrying positions; an apron cooperable with the forward part of said bowl; a floating support for said apron carrying said apron in lowered position so that it may be raised by the external application of force resulting from engagement with material lying on the ground; and apron lifting means connected to said apron and said latch means.

10. In a scraper of the class described, the combination of: a bowl movable between digging, carrying, and dumping positions; a draft frame whereby said bowl may be moved along the ground; stop means on said bowl; a latch bar engageable with said stop; a latch bar link movably connected to said draft frame and said latch bar; means for longitudinally moving said latch bar for moving said bowl between digging and carrying positions; an apron cooperable with the forward part of said bowl; a floating support for said apron carrying said apron in lowered position so that it may be raised by the external application of force resulting from engagement with material lying on the ground; and apron operating means connected to said apron and said latch bar link.

11. In a scraper of the class described, the combination of: a bowl rotatively adjustable about horizontal transverse lines; a draft frame whereby said bowl may be moved along the ground; control means for said bowl embracing a latch means to provide engagement with said bowl, said control means being movable to move said latch means with the engaged portion of said bowl in a direction to in turn move said bowl through different positions of adjustment including working and non-working positions; power means to move said control means; and means operating in response to an actuation selected by the operator of said power means to definitely change the direction of movement of said latch means for releasing said latch means.

12. In a scraper of the class described, the combination of: a bowl rotatively adjustable about horizontal transverse lines; a draft frame whereby said bowl may be moved along the ground; a bar movably supported on said draft frame; latch means to connect said bar to said bowl whereby movement and position of said bowl may be determined by said bar; means operative to move said bar for moving said latch means tangentially to the line of movement of the connected portion of said bowl through a plurality of positions of adjustment; and means operating in consequence of the movement of said bar into a prescribed position to move said bar and changing the direction of movement of said latch means from said tangential path to a path which is radial with reference to the movement of adjustment of said bowl to release said latch means.

13. In a scraper of the class described, the combination of: a bowl rotatively adjustable about horizontal transverse lines; a draft frame whereby said bowl may be moved along the ground; a stop on said bowl; a latch bar movably supported by said draft frame in a position longitudinal of the scraper and having a latch element engageable with said stop to hold said bowl against rotation by a reactive force acting longitudinally only on said latch bar; means for longitudinally moving said latch bar along the line of said reactive force to shift said latch element longitudinally; and means brought into operation in consequence of said latch bar reaching a predetermined longitudinal position, said last named means being operable to move said latch bar transversely for moving said latch element across the line of action of said reactive force and out of engagement with said stop.

14. In a scraper of the class described, the combination of: a bowl rotatively adjustable about horizontal transverse lines; a draft frame whereby said bowl may be moved along the ground; a stop on said bowl; a latch bar movably supported by said draft frame and having a latch element engageable with said stop to move therewith in a common arcuate path to make said rotative adjustments; means for longitudinally moving said latch bar to move said latch element and stop along said arcuate path; and means brought into operation in consequence of said latch bar moving into an extreme rearward position, said last named means being operable to move said latch bar to change the direction of movement of said latch means from that of said arcuate path to a direction transverse thereto for disengaging said latch element from said stop.

LEO BERNER.
CLAUDE B. OGLE.

CERTIFICATE OF CORRECTION.

Patent No. 2,293,636. August 18, 1942.

LEO BERNER, ET AL.

It is hereby certified that error appears in the printed specification of the above numbered patent requiring correction as follows: Page 4, first column, line 54, claim 10, for "operating" read --lifting--; and that the said Letters Patent should be read with this correction therein that the same may conform to the record of the case in the Patent Office.

Signed and sealed this 13th day of October, A. D. 1942.

(Seal)

Henry Van Arsdale,
Acting Commissioner of Patents.